US010075539B1

(12) United States Patent
Sabur et al.

(10) Patent No.: US 10,075,539 B1
(45) Date of Patent: Sep. 11, 2018

(54) PAIRING A VOICE-ENABLED DEVICE WITH A DISPLAY DEVICE

(71) Applicant: Google LLC, Mountain View, CA (US)

(72) Inventors: Zaheed Sabur, Adliswil (CH); Andrea Terwisscha van Scheltinga, Zürich (CH); Mikhail Reutov, Zug (CH); Lucas Mirelmann, Zürich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/699,323

(22) Filed: Sep. 8, 2017

(51) Int. Cl.
*H04L 29/08* (2006.01)
*G06F 3/16* (2006.01)

(52) U.S. Cl.
CPC .............. *H04L 67/16* (2013.01); *G06F 3/167* (2013.01)

(58) Field of Classification Search
None
See application file for complete search history.

(56) References Cited

U.S. PATENT DOCUMENTS

| 2013/0238326 | A1 | 9/2013 | Kim et al. |
| 2016/0111091 | A1 | 4/2016 | Bakish |
| 2016/0162259 | A1 | 6/2016 | Zhao et al. |
| 2017/0353549 | A1* | 12/2017 | Passeri ................... G06F 3/023 |

* cited by examiner

*Primary Examiner* — Angela Nguyen
(74) *Attorney, Agent, or Firm* — Fish & Richardson P.C.

(57) ABSTRACT

Methods, systems, and apparatus, including computer programs encoded on a computer storage medium, for pairing a speech-enabled device with a display device. A determination may be made to pair a speech-enabled device with a display device of a particular type. A set of display devices that are associated with the speech-enabled device may be identified in response to determining to pair the speech-enabled device with the display device of the particular type. An instruction may be provided to each of the display devices. The instruction may cause the display device to determine (i) whether the display device is of the particular type and (ii) whether the display device and the speech-enabled device both share a local area network and display on the display device an indication regarding pairing with the speech-enabled device.

24 Claims, 5 Drawing Sheets

PAIRING A VOICE-ENABLED DEVICE WITH A DISPLAY DEVICE

FIELD

The present specification relates to pairing of devices, for example for presentation of graphical content on one device associated with another device.

BACKGROUND

Computing systems may be configured to receive multiple voice queries and to generate reply content that is responsive to each of the voice queries. The generated reply content can be provided for output to a user in an audio data format, a visual data format, or both. For example, computing systems can receive respective voice queries in which a user seeks to obtain information about a particular media/content item, meeting location, or subject matter that relates to a variety of conversational topics. Users that provide voice queries to an example client/computing device may desire to receive at least a subset of reply content in a particular data format that provides for a more convenient user experience but that may not be possible to be provided by a user device to which the user provides the voice query.

SUMMARY

A system may pair a speech-enabled device with a display device. Pairing a speech-enabled device with a display device may cause at least some visual information regarding a voice interaction to be displayed on the display device to enhance the voice interaction. For example, if a speaker, i.e., a person speaking, says "OK Computer, what is the weather today," the speech-enabled device may audibly reply "It is sunny and seventy degrees today" and a display device paired to the speech-enabled device may display a transcription of the voice interaction or display an hourly forecast. The speaker may then both listen to the audible reply and glance at the visual information displayed on the display device.

The system may pair a speech-enabled device and a display device in response to a user saying one or more terms for pairing and one or more terms indicating a type of display device. For example, the system may pair a speech-enabled device and a tablet in response to a user saying "OK Computer, pair with my tablet." To ensure that the speech-enabled device pairs with the correct display device, when a user says the one or more terms for pairing and a term indicating the type of display device, the system may determine whether any information on a prior pairing between the speech-enabled device and a tablet exist. If no such prior information exists, the system may send instructions to display devices associated with the speech-enabled device.

The instructions may cause each of the display devices to determine whether they are a display device of the type requested and determine whether the display device is on the same local area network as the speech-enabled device. A determination that the display device is on the same local area network as the speech-enabled device may mean it is likely that the display device is within visual range of a person speaking with the speech-enabled device.

Display devices that determine that they are both of the requested display device type and on the same local area network may then display a visual indication that the speaker can interact with to confirm that the display device is the correct device to pair with the speech-enabled device. Once the speaker confirms the display device should pair with the speech-enabled device, the system may then pair the speech-enabled device and the display device so that the display device shows visual information regarding voice interaction between the speaker and the speech-enabled device.

One innovative aspect of the subject matter described in this specification is embodied in methods that include the actions of determining to pair a speech-enabled device with a display device of a particular type, in response to determining to pair the speech-enabled device with the display device of the particular type, identifying a set of display devices that are associated with the speech-enabled device, and, for each of the display devices of the set of display devices that are identified, providing an instruction to the display device. The instruction causes the display device to determine (i) whether the display device is of the particular type and (ii) whether the display device and the speech-enabled device both share a local area network and in response to determining that (i) the display device is of the particular type and (ii) the display device and the speech-enabled device both share the local area network, display on the display device an indication regarding pairing with the speech-enabled device.

One innovative aspect of the subject matter described in this specification is embodied in methods that include the actions of receiving a request to pair a first device with a second device, the request includes an identifier associated with the first device, determining a plurality of further devices based upon the request, where the plurality of further devices includes the second device, transmitting data associated with the identifier to each of the plurality of further devices, receiving, from the second device, data indicating that the second device is connected to a local area network associated with the first device, where the data indicating that the second device is connected to a local area network associated with the first device is generated based upon the transmitted data associated with the identifier, and storing data associating the first device with the second device based upon the received data indicating that the second device is connected to a local area network associated with the identifier.

One innovative aspect of the subject matter described in this specification is embodied in methods that include the actions of receiving, from a server at a second device connected to a local area network, an identifier associated with a first device, for each network device connected to the local area network, determining whether the received identifier corresponds to an identifier associated with the network device, and in response to determining that the received identifier corresponds to an identifier associated with the network device, transmitting, to the server, data indicating that the second device is connected to a local area network associated with the identifier.

One innovative aspect of the subject matter described in the specification is embodied in methods that include the actions of determining to pair a speech-enabled device with a display device, in response to determining to pair the speech-enabled device with the display device, identifying a set of display devices that are associated with the speech-enabled device, for each of the display devices of the set of display devices that are identified, providing an instruction to the display device that causes the display device to determine whether the display device and the speech-enabled device both share a local area network and in response to determining that the display device and the speech-enabled device both share the local area network, display on the display device an indication regarding pairing with the speech-enabled device.

Other implementations of these aspects include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in certain aspects, determining to pair a speech-enabled device with a display device of a particular type includes receiving, from the speech-enabled device, an utterance including a term for the particular type of display device and a term corresponding to an instruction to pair. In some aspects, identifying a set of display devices that are associated with the speech-enabled device includes identifying a user of the speech-enabled device and identifying display devices that are associated with an account of the user of the speech-enabled device. In some implementations determine whether the display device and the speech-enabled device both share a local area network includes provide a request that devices on the local area network identify themselves, receive identifiers from the devices on the local area network in response to the request, and determine whether any identifier received from the devices on the local area network matches an identifier of the speech-enabled device.

In certain aspects, display on the display device an indication regarding pairing with the speech-enabled device includes displaying a prompt on the display device that requests that a user confirm whether to pair the display device with the speech-enabled device. In some aspects, actions include receiving an indication from a particular display device of the display devices that confirms to pair the particular display device with the speech-enabled device and storing an indication to, in the future, pair the particular display device and the speech-enabled device in response to determining to pair the speech-enabled device with a display device of the particular type. In some implementations, actions include determining that the speech-enabled device was not previously paired with a display device of the particular type. In certain aspects, the display device includes one or more of a tablet, laptop, or smartphone.

In some aspects, determining a plurality of further devices based upon the request includes determining an account associated with the first device and determining devices associated with the account. In some implementations, each respective device of the plurality of devices is configured to, in response to receiving the identifier associated with the first device and for each network device connected to a respective local area network of the respective device determine whether the received identifier corresponds to an identifier associated with the network device. In certain aspects, determining whether the received identifier corresponds to an identifier associated with the network device is based upon a multicast processing. In some aspects, each respective device of the plurality of devices is configured to, in response to determining that the received identifier corresponds to an identifier associated with the network device display on a display of the respective device, an indication associated with pairing with the first device. In some implementations, each respective device of the plurality of devices is configured to receive user input in response to the indication associated with pairing with the first device.

In certain aspects, each respective device of the plurality of devices is configured to transmit data indicating that the respective device is connected to a local area network associated with the identifier. In some aspects, the first device is a speech-enabled device, and the second device is a display device. In some implementations, actions include causing data associated with the first device to be displayed by the second device based upon the stored data associating the first device with the second device. In certain aspects, the request to pair a first device with a second device is generated based upon an utterance including a term corresponding to an instruction to pair the first device with a second device. In some aspects, each respective device of the plurality of devices is configured to receive an indication that an operation is being performed on one of the plurality of devices and provide the indication for output to a user. In some implementations, actions include receiving a device type, where the plurality of further devices are further determined based upon the device type. In certain aspects, the second device includes one or more of a tablet, laptop, or smartphone.

The subject matter described in this specification can be implemented in particular implementations and can result in one or more of the following advantages. The claimed subject matter may provide a way of pairing devices with one another that, from a user perspective, is simple and that requires minimal user input or knowledge. Pairing may be initiated and successfully achieved from a device that has a reduced user interface, for example a device that does not have a display, such as a speaker with voice command input. By using an identifier associated with the device from which pairing is initiated and stored data associated with the identifier, pairing may be achieved securely such that pairing with an incorrect device may be prevented. Improved systems and methods of interacting with a user to provide pairing of devices may therefore be provided. The claimed subject matter may therefore address problems associated with pairing of devices including ensuring that a correct device is paired with a device from which pairing is initiated in a secure and simple way.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
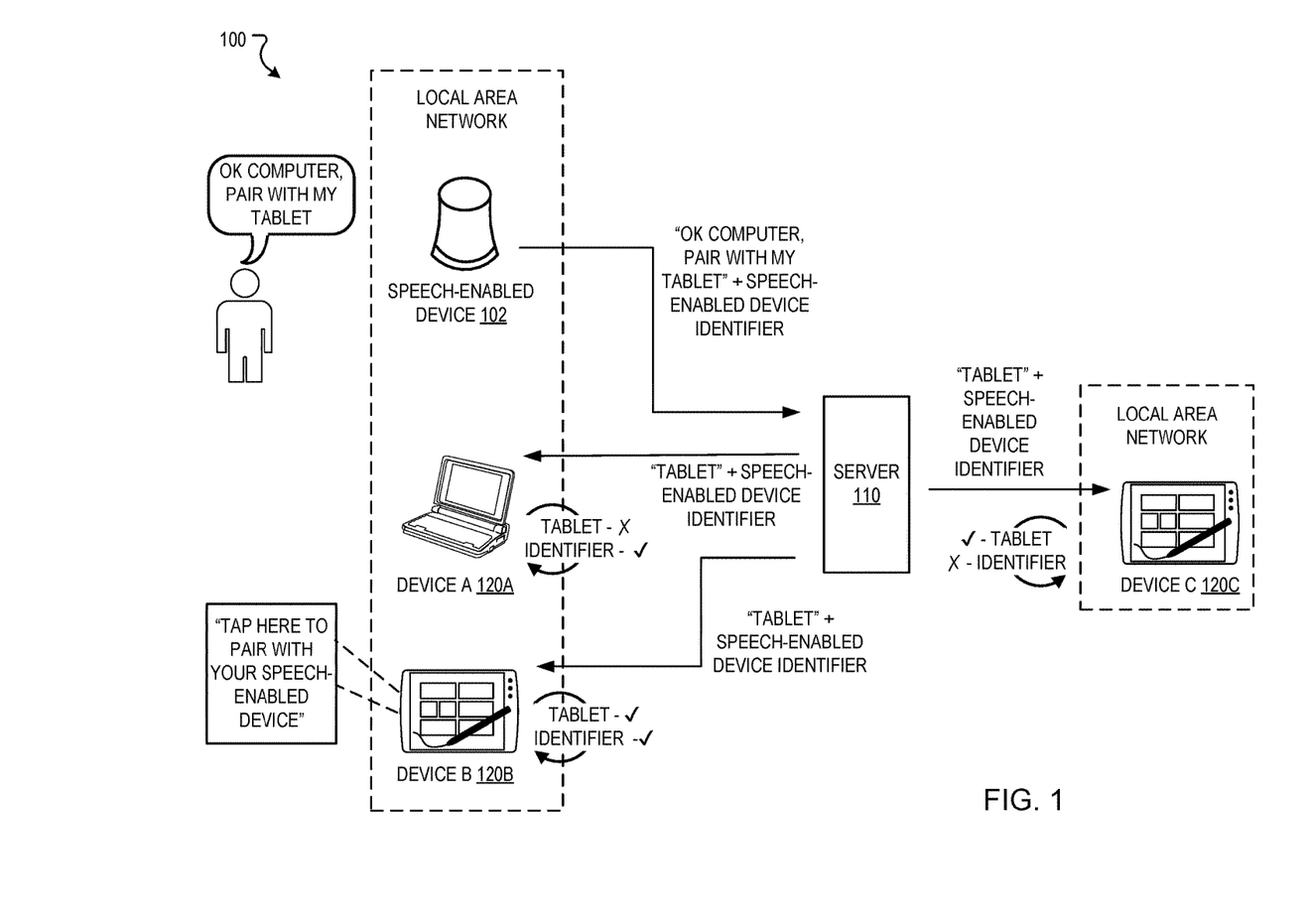
FIG. 1 illustrates a diagram of an example system with a speech-enabled device pairing with a display device.

FIG. 1 illustrates a diagram of an example system 100 with a speech-enabled device 102 pairing with a display device 120B. The system 100 includes the speech-enabled device 102, the server 110, and display devices 120A-120C. As described in more detail below, FIG. 1 illustrates the display device 120B displaying a visual indication that requests a speaker confirm that the display device 120B should be paired with the speech-enabled device 102.

The speech-enabled device 102 may be a device that includes one or more microphones and one or more speakers. The speech-enabled device 102 may receive utterances using the one or more microphones and output audible responses to the utterances through the one or more speakers. The speech-enabled device 102 may receive spoken utterances and provide the utterances to the server 110 along with an identifier for the speech-enabled device. For example, the speech-enabled device 102 may provide the server 110 mel-frequency cepstral coefficients (MFCCs) of a person saying "OK Computer, pair with my tablet" along with a speech-enabled device identifier of "00:11:22:33:44:55." The speech-enabled device identifier may be a serial number, a media access control address (MAC address), or some other identifier that uniquely identifies the speech-enabled device 102 from among at least other speech-enabled devices.

The speech-enabled device 102 may receive responses back from the server 110 and audibly output those responses through one or more speakers of the speech-enabled device 102. For example, the speech-enabled device 102 may receive text of "Successfully paired" from the server 110 and perform text-to-speech synthesis and then output the synthesized speech, or receive audio of synthesized speech of "Successfully paired" from the server 110 and then output the audio.

The speech-enabled device 102 may receive requests from the display devices 102A-C for the speech-enabled device to identify itself and, in response, provide a response that includes the speech-enabled device identifier. For example, the speech-enabled device 102 may receive a uPnP multicast message from the device B 120B requesting that the speech-enabled device 102 identify itself and, in response, provide a response through uPnP that includes the speech-enabled device identifier of "00:11:22:33:44:55."

The server 110 may determine to pair the speech-enabled device 102 with a display device of a particular type. For example, the server 110 may receive an utterance of "OK Computer, pair with my tablet" along with the speech-enabled device identifier of "00:11:22:33:44:55" and, in response, determine to pair the speech-enabled device 102 having the identifier of "00:11:22:33:44:55" with a tablet. The server 110 may determine that the terms "Pair with my" indicate an instruction to pair and the term "tablet" indicates the particular type of display device with which to pair.

The server 110 may determine an account that corresponds to the request to pair. For example, the server 110 may determine that the received identifier of "00:11:22:33:44:55" matches a speech-enabled device identifier that information for an account of "John Doe" indicates is being used by "John Doe" and, in response, determine that the account of "John Doe" corresponds to the request. In some implementations, the server 110 may determine an account by identifying the speaker and then determining an account for the identified speaker. For example, the speech-enabled device 102 may be used by multiple people and the server 110, or the speech-enabled device 102 may perform voice identification on the utterance to determine whether the voice of a speaker matches a voice associated with an account of a user. If there is a match, the server 110 then determine the account associated with the voice corresponds to the request.

The server 110 may identify display devices that correspond to the request based on the information of the account determined to correspond to the request. For example, the server 110 may determine that information in the account of "John Doe" indicates that "John Doe" also uses device A 120A, device B 120B, and device 120C.

The server 110 may provide, to each of the display devices 120A-C that are identified, an instruction that causes the display device to determine whether the display device is of the particular type and whether the display device and the speech-enabled device are both connected to the same local area network, or in other words, share the same local area network. For example, the server 110 may transmit an instruction to each of device A 120A, device B 120B, and device 120C, where each instruction includes the device type "Tablet" and the identifier of "00:11:22:33:44:55" for the speech-enabled device 102. For simplicity, the instruction the server 110 sends to the display devices 120A-C may be referred to herein as a pair check instruction. A local area network may be a local network provided through Ethernet, Wi-Fi, Bluetooth, etc. For example, a local area network may be a network provided by a router in a home that connects devices within the home to one another.

The server 110 may receive data back from a display device that indicates that the display device should be paired with the speech-enabled device 102. For example, the device B 120B may provide the server 110 an instruction to pair the device B with the speech-enabled device 102. In some implementations, as described further below, a display device may only provide such data to the server 110 when the display device is connected to the same local network that the speech-enabled device 102 is connected to, so the server 110 receiving such data may indicate that the display device is connected to the same local network that the speech-enabled device 102 is connected to.

In response to receiving data back from a display device that indicates that the display device should be paired with the speech-enabled device 102, the server 110 may store data associating the speech-enabled device 102 with the display device. For example, the server 110 may store an indication that the device B 120B should display visual information regarding voice interactions between a speaker and the speech-enabled device 102. Based on the stored indication, when the server 110 later receives an utterance and generates an audible reply for the speech-enabled device 102 to output, the server 110 may also generate visual information and provide the visual information to the paired display device.

Device A 120A, device B 120B, and device 120C may be display devices. Display devices may include a tablet, a laptop, a smartphone, or some other device that includes a display. The display device 120A-C may receive the pair check instruction. For example, the display devices 120A-C may each receive an instruction that includes the device type "Tablet" and the identifier of "00:11:22:33:44:55" for the speech-enabled device 102. FIG. 1 illustrates display device A 120A and display device B 120B on the same local area network as the speech enabled device 102 and display device C 120C on a different local area network.

In response to receiving the pair check instruction, each of the display devices 120A-C may determine whether the display device is of that device type. For example, device A 120A may determine that it is a laptop so is not of the device type of "Tablet" indicated by the pair check instruction. In another example, display device B 120B may determine that it is a tablet so is of the device type of "Tablet" indicated by the pair check instruction.

In response to receiving the pair check instruction, each of the display devices 120A-C may also determine whether the display device is on a same local area network as the speech-enabled device 102. For example, device A 120A may determine whether the speech-enabled device 102 is connected to the same local area network with which device A 120A is connected. Each of the display devices 120A-C devices may determine whether the speech-enabled device 102 is on the same local network as the display device based on providing an instruction to all devices on the same local area network to provide an identifier and then determine whether any identifier received from those devices matches the identifier in the pair check instruction. The instruction that each of the display devices 120A-C send for devices on their local area networks to identify themselves may be in the form of a multicast message using Universal Plug and Play (uPnP) or some other networking protocol. Whilst it is described herein that a device transmits a request to provide a device identifier to devices connected to a local area network, it will be appreciated that determination of whether a device is connected to a local area network that has a corresponding device identifier may be carried out in any convenient way known to those skilled in the art.

For example, the device A 120A may send an instruction to the speech-enabled device 102 and the device B 120B that requests an identifier. The device B 120B may provide an identifier of "55:44:33:22:11:00" which the device A 120A determines does not match the identifier of "00:11:22:33:44:55" included in the pair check instruction from the server 110. The speech-enabled device 102 may provide an identifier of "00:11:22:33:44:55" which the device A 120A determines does match the identifier of "00:11:22:33:44:55" included in the pair check instruction from the server 110 and, in response, the device A 120A may determine that the speech-enabled device 102 share the same local area network.

In another example, the device C 120C may send, to any and all devices that are connected to the local area network with which device C 120C is connected, an instruction to provide an identifier. However, because in system 100 no other devices are on the local area network that device C 120C is connected with, device C 120C may not receive any responses that include an identifier that matches the identifier of "00:11:22:33:44:55" included in the pair check instruction from the server 110. Accordingly, device C 120C may determine that no responses are received with an identifier that matches the identifier of "00:11:22:33:44:55" included in the pair check instruction from the server 110 and, in response, determine that the speech-enabled device 102 does not share the same local area network.

Each of the display devices 120A-C that determines that both the display device is of the device type indicated by the pair check instruction and is on the same local area network as the speech-enabled device 102 may then display an indication regarding pairing with the speech-enabled device 102. For example, device B 120B may determine that it is a device type of "Tablet" indicated by the pair check instruction and is on the same local area network as a device with the identifier "00:11:22:33:44:55" and, in response, displays "Tap here to pair with your speech-enabled device." In another example, device A 120A may determine that it is not of a device type of "Tablet" indicated by the pair check instruction and is on the same local area network as a device with the identifier "00:11:22:33:44:55" and, in response, does not display "Tap here to pair with your speech-enabled device." In yet another example, device C 120C may determine that it is a device type of "Tablet" indicated by the pair check instruction but is not on the same local area network as a device with the identifier "00:11:22:33:44:55" and, in response, does not display "Tap here to pair with your speech-enabled device."

The display device 120B may receive input from the user indicating to pair with the speech-enabled device 102 and, in response, provide an indication to the server 110 that the display device 120B should be paired with the speech-enabled device 102. For example, the display device 120B may detect that a user has touched a portion of the display of the display device 120B that shows "Tap here to pair with your speech-enabled device" and, in response, provide the server 110 an instruction to pair the display device 120B with the speech-enabled device 102. Such an instruction from a display device may indicate that the display device is connected to the same local area network as the speech-enabled device 102.

In some implementations, the server 110 may store information for use in later pairing to avoid having to continue to send pair check instructions to various display devices. Accordingly, in response to receiving data back from a display device that indicates that the display device should be paired with the speech-enabled device 102, the server 110 may store data indicating that when the server 110 later determines to pair a speech-enabled device 102 and a display device of the particular type of the display device, the server 110 should pair the speech-enabled device 102 and the display device without identifying devices and sending pair check instructions to each identified device. Accordingly, when the server 110 later determines an account and before sending pair check instructions to the display devices 120A-C, the server 110 may determine whether pairing information is already stored for the speech-enabled device 102 and display device of the type indicated in the request.

For example, in response to receiving a later request of "Pair with my tablet," the server 110 may determine whether the account determined to correspond with the request to pair indicates a previous pairing between the speech-enabled device 102 and a display device of a type of "Tablet." In response to determining that pairing information is already stored for a pairing between the speech-enabled device 102 and display device of the type indicated in the request, the server 110 may instruct the speech-enabled device 102 and the display device to pair without identifying devices and sending pair check instructions to each identified device. In response to determining that pairing information is not already stored for a pairing between the speech-enabled device 102 and display device of the type indicated in the request, the server 110 may identify devices and send pair check instructions to each identified device, as described above.

In some implementations, the server 110 may obtain information indicating the type of the devices that are identified as being associated with the speech-enabled device 102 and then only send a pair check instruction to those identified devices that are of the type that is to be paired with the speech-enabled device 102. For example, in response to determining to pair the speech-enabled device 102 with a display device of a type "Tablet," the server 110 may retrieve information stored by the server 110 that indicates that device A 120A is a laptop, device B 120B is a tablet, and device C 120C is a tablet. The server may then determine that device A 120A is a laptop so does not match the requested type of "Tablet" so does not send a pair check instruction to device A 120A, determine that device B 120B is a tablet so does match the requested type of "Tablet" so does send a pair check instruction to device B 120B, and determine that device C 120C is a tablet so does match the requested type of "Tablet" so does send a pair check instruction to device C 120C. Accordingly, as only the display devices that match the requested device type receive the pair check instruction, the display devices may only need to determine whether they are on the same local area network as the speech-enabled device 102 and do not need to determine whether they are of a device type that matches the requested device type. Therefore, the pair check instruction may include the speech-enabled device 102 identifier but omit including the device type.

In some implementations, the server 110 may not send a pair check instruction to the devices 120A-C and may instead provide information identifying the devices 102A-C to the speech-enabled device 102 and the speech-enabled device 102 may then determine whether the devices 120A-C are on the same local network. For example, the speech-enabled device 102 may receive identifiers for devices 120B and 120C after the server 110 determines those devices are of a type tablet, the speech-enabled device 102 may then send a request for all devices on its local network to identify themselves, and in response to determining that a response to the request includes one of the identifiers provided by the server 110, then send an instruction for the device that provided that response to display a prompt on the device for the user to confirm to pair that device with the speech-enabled device 102.

Figure 2:
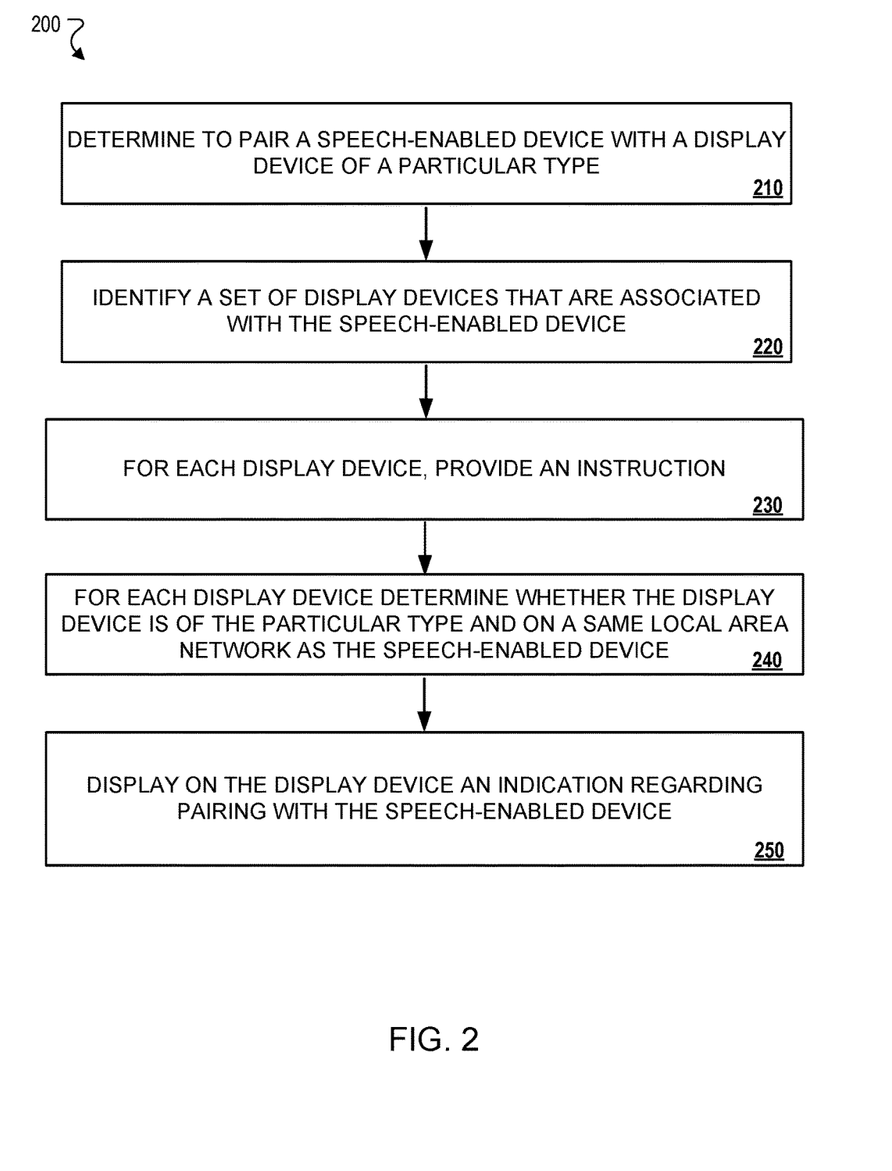
FIG. 2 is a flow diagram of an example process for pairing a speech-enabled device with a display device.

FIG. 2 is a flow diagram of an example process 200 for pairing a speech-enabled device with a display device. Process 200 can be implemented using system 100 described above. Thus, descriptions of process 200 may reference one or more of the above-mentioned components, modules, or computational devices of system 100. In some implementations, described actions of process 200 are enabled by computing logic or software instructions executable by a processor and memory of an example electronic device, such as the server 110 and devices 102A-C.

The process 200 includes determining to pair a speech-enabled device with a display device of a particular type (210). For example, the server 110 may receive acoustic features of "OK Computer, pair with my laptop" from the speech-enabled device 102, transcribe the acoustic features into text of "OK Computer, pair with my laptop," and determine that the text "pair with my laptop" indicates to pair the speech-enabled device 102 with a display device of the type "laptop."

The process 200 includes in response to determining to pair the speech-enabled device with the display device of the particular type, identifying a set of display devices that are associated with the speech-enabled device (220). For example, the server 110 may also receive an identifier of "00:11:22:33:44:55" for the speech-enabled device 102 along with acoustic features, determine that the identifier is listed by an account for a user as belonging to a device used for the account and then identify device A 120A, device B 120B, and device C 120C from information stored for the account that indicates those devices are also used for the account.

The process 200 includes, for each of the display devices of the set of display devices that are identified, providing an instruction (230). For example, the server 110 may provide each of the display devices 120A-C a pair check instruction that includes the identifier of "00:11:22:33:44:55" for the speech-enabled device 102 and an indication of the type of "Laptop."

The process 200 includes determining whether the display device is of the particular type and whether the display device and the speech-enabled device both share a local area network (240). For example, the device A 102A may determine that it is a type of "Laptop" and determine that it is on the same local area network as the speech-enabled device 102.

The process 200 includes displaying on the display device an indication regarding pairing with the speech-enabled device (250). For example, in response to device A 102A determining that it is a type of "Laptop" and determining that it is on the same local area network as the speech-enabled device 102, device A 102A may display a prompt of "Tap here to pair with your speech-enabled device." In another example, device B 102B may determine that it is not of the type "Laptop" and, in response, determine not to display a prompt of "Tap here to pair with your speech-enabled device."

Figure 3:
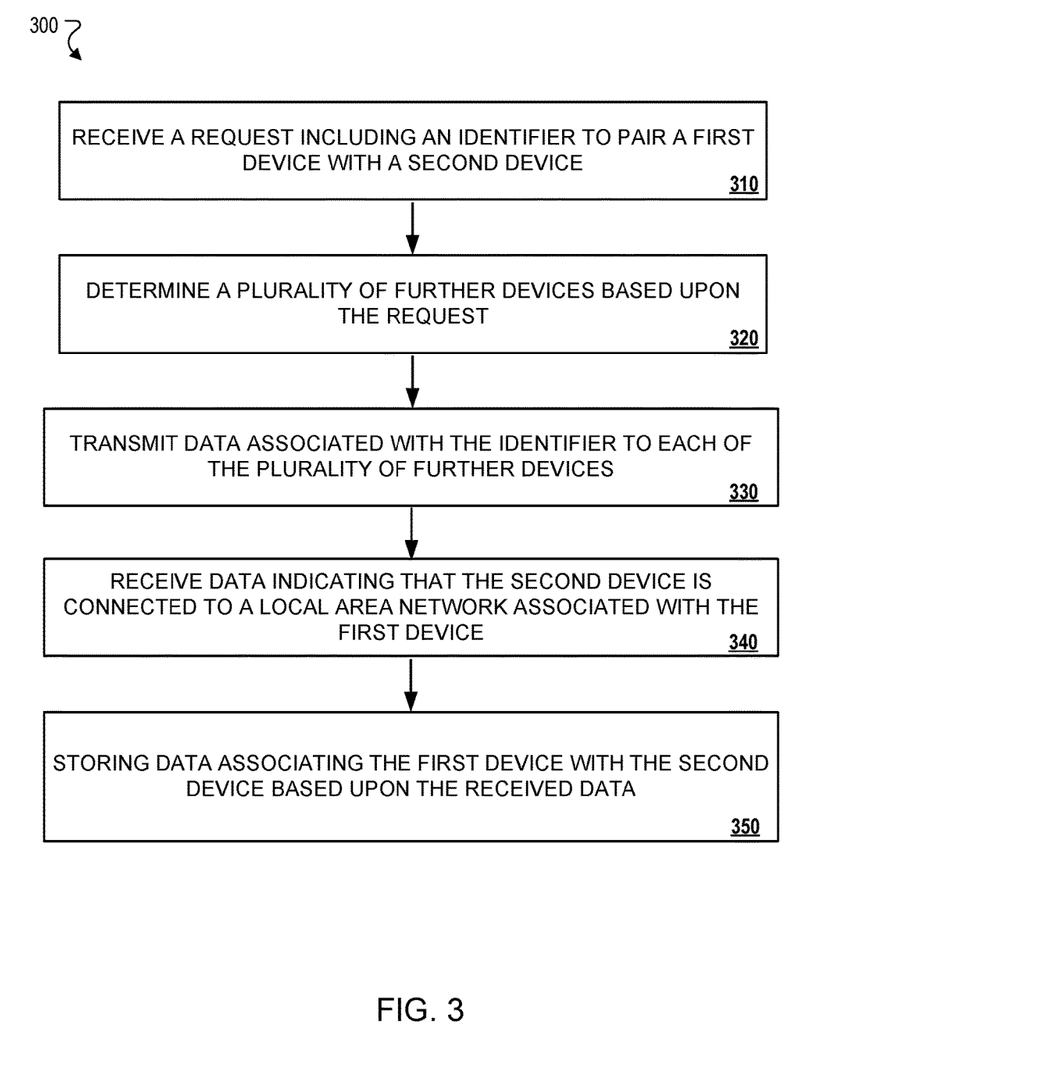
FIG. 3 is a flow diagram of another example process for pairing a speech-enabled device with a display device.

FIG. 3 is a flow diagram of another example process 300 for pairing a speech-enabled device with a display device. Process 300 can be implemented using system 100 described above. Thus, descriptions of process 300 may reference one or more of the above-mentioned components, modules, or computational devices of system 100. In some implementations, described actions of process 300 are enabled by computing logic or software instructions executable by a processor and memory of an example electronic device, such as server 110.

The process 300 includes receiving a request to pair a first device with a second device, the request including an identifier associated with the first device (310). For example, the server 110 may receive from the speech-enabled device 102 acoustic features of the utterance "OK Computer, pair with my tablet" along with the identifier "00:11:22:33:44:55" of the speech-enabled device 102.

The process 300 includes determining a plurality of further devices based upon the request, where the plurality of further devices include the second device (320). For example, the server 110 may determine the device with the identifier "00:11:22:33:44:55" is linked with an account that is also linked with the devices 120A-C. The determination may further be based upon a device type identified in the utterance, for example a device type "tablet," in combination with data stored at the server associated with each of devices 120A-C, as described above.

The process 300 includes transmitting data associated with the identifier to each of the plurality of further devices (330). For example, the server 110 may transmit a pair check instruction that includes the identifier "00:11:22:33:44:55" to each of the devices 120A-C. The pair check instruction may additionally include a device type as described above.

The process 300 includes receiving, from the second device, data indicating that the second device is connected to a local area network associated with the first device, where the data indicating that the second device is connected to a local area network associated with the first device is generated based upon the transmitted data associated with the identifier (340). For example, the server 110 may receive an indication from device B 120B that indicates device B 120B is on the same local area network as the speech-enabled device 102. The indication from device B that indicates device B is on the same local area network as the speech-enabled device may be generated in the manner described above with reference to FIGS. 1 and 2.

The process 300 includes storing data associating the first device with the second device based upon the received data indicating that the second device is connected to a local area network associated with the identifier (350). For example, the server 110 may store an indication that speech-enabled device 102 and the device B 120B are paired so that the device B 120B should display visual information regarding voice interactions between a speaker and the speech-enabled device 102. The stored data may also be used by the server 110 to later determine to pair the first device and second device without needing the second device to again determine whether it is on the same local area network as the first device.

Figure 4:
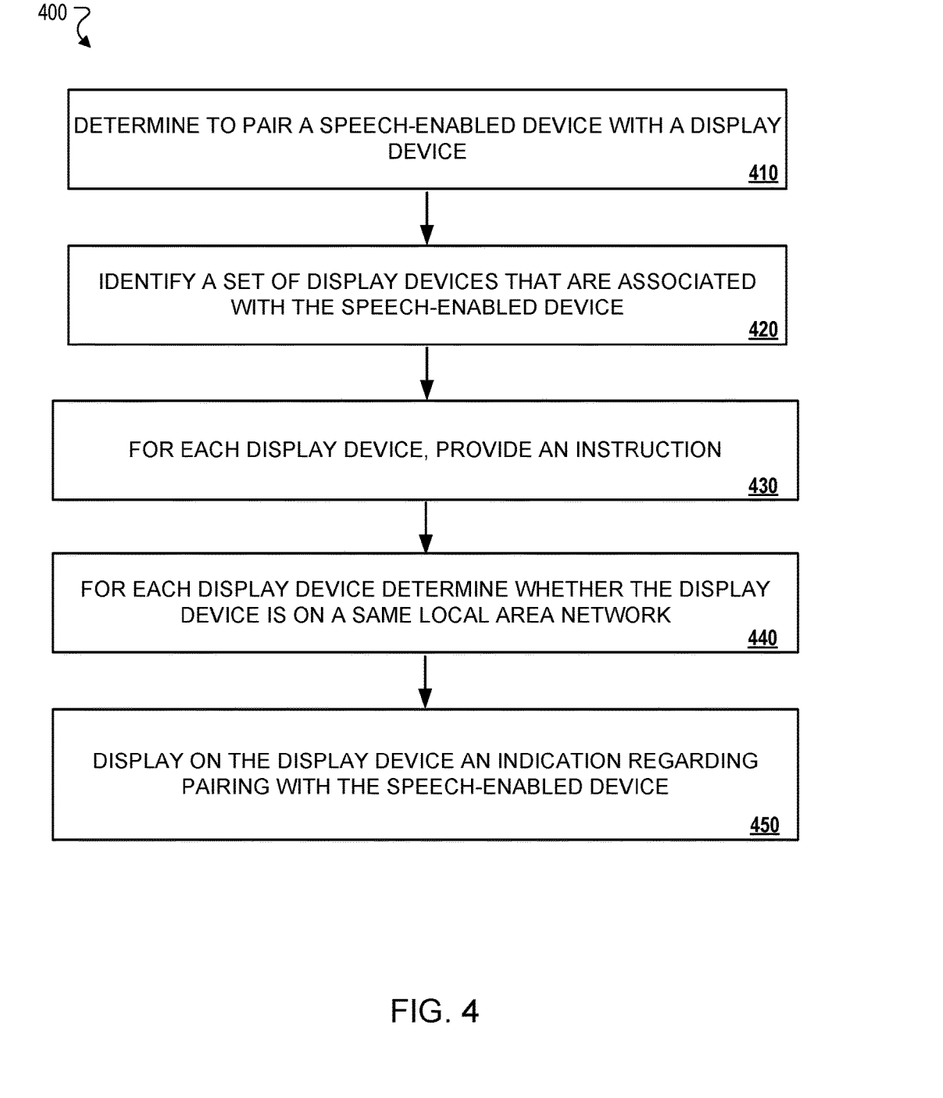
FIG. 4 is a flow diagram of yet another example process for pairing a speech-enabled device with a display device.

FIG. 4 is a flow diagram of an example process 400 for pairing a speech-enabled device with a display device. Process 400 can be implemented using system 100 described above. Thus, descriptions of process 400 may reference one or more of the above-mentioned components, modules, or computational devices of system 100. In some implementations, described actions of process 400 are enabled by computing logic or software instructions executable by a processor and memory of an example electronic device, such as the server 110 and devices 102A-C.

In the process 400, the server 110 may already store information that indicates the particular types of the devices 102A-C. For example, the server 110 may store a table that includes a row for each of the devices 102A-C and in each row indicate an identifier that uniquely identifies the device, e.g., a MAC address, and an indicator that indicates the type of the device, e.g., a textual label of "tablet," "laptop," or some other indicator. The server 110 may then determine which devices 102A-C are of the type requested using the information already stored by the server 110 and then provide an instruction to only those devices 102A-C to cause those devices 102A-C to determine whether they are on the same network as the speech-enabled device 102. Because the server 110 only sends the instruction to the devices that the server 110 determines are of the requested type, the devices themselves do not need to also determine whether they are of that particular type in response to the request and may only need to determine whether they are on the same local area network as the speech-enabled device 102.

The process 400 includes determining to pair a speech-enabled device with a display device (410). For example, the server 110 may receive acoustic features of "OK Computer, pair with my tablet" from the speech-enabled device 102, transcribe the acoustic features into text of "OK Computer, pair with my tablet," and determine that the text "pair with my tablet" indicates to pair the speech-enabled device 102 with a display device.

The process 400 includes in response to determining to pair the speech-enabled device with a display device, identifying a set of display devices that are associated with the speech-enabled device (420). For example, the server 110 may also receive an identifier of "00:11:22:33:44:55" for the speech-enabled device 102 along with acoustic features, determine that the identifier is listed by an account for a user as belonging to a device used for the account and then identify device A 120A, device B 120B, and device C 120C from information stored for the account that indicates those devices are also used for the account. In some implementations, the server 110 may only include in the set display devices of a type that are requested. For example, the server 110 may reference a table stored by the server 110 that indicates devices and the types for each of the devices and only include in the set of devices those devices that the table indicates are of the requested type.

The process 400 includes, for each of the display devices of the set of display devices that are identified, providing an instruction (430). For example, the server 110 may provide each of the display devices 120A-C a pair check instruction that includes the identifier of "00:11:22:33:44:55" for the speech-enabled device 102.

The process 400 includes determining whether the display device and the speech-enabled device both share a local area network (440). For example, the device A 102A may determine that it is on the same local area network as the speech-enabled device 102.

The process 400 includes displaying on the display device an indication regarding pairing with the speech-enabled device (450). For example, in response to device A 102A determining that it is on the same local area network as the speech-enabled device 102, device A 102A may display a prompt of "Tap here to pair with your speech-enabled device." In another example, device B 102B may determine that it is not on the same local area network as the speech-enabled device 102 and, in response, determine not to display a prompt of "Tap here to pair with your speech-enabled device."

Figure 5:
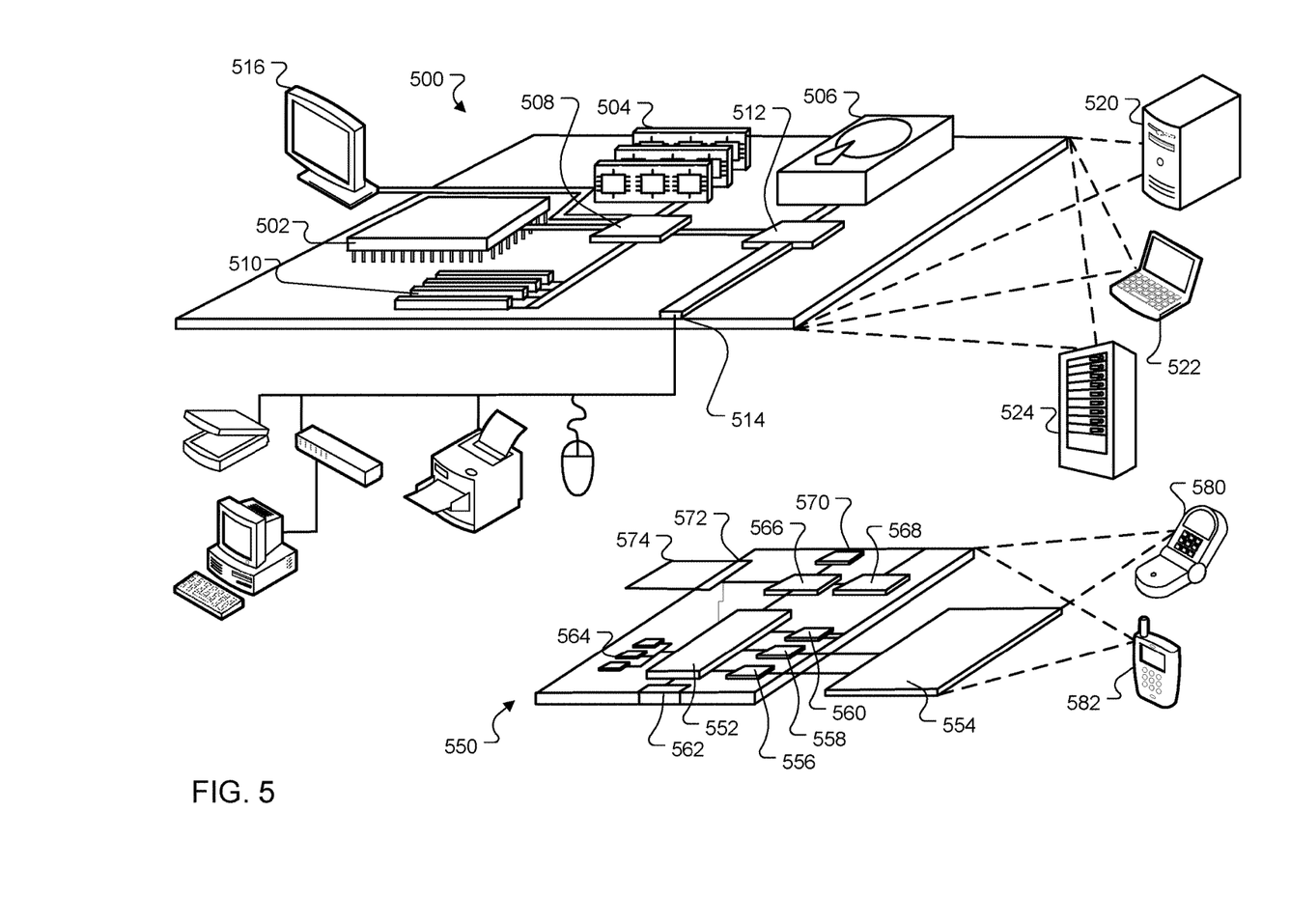
FIG. 5 is a block diagram of a computing system that can be used in connection with computer-implemented methods described in this specification.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, the method comprising:
   determining to pair a speech-enabled device with a display device of a particular type;
   in response to determining to pair the speech-enabled device with the display device of the particular type, identifying a set of display devices that are associated with the speech-enabled device;
for each of the display devices of the set of display devices that are identified, providing an instruction to the display device that causes the display device to:
determine (i) whether the display device is of the particular type and (ii) whether the display device and the speech-enabled device both share a local area network; and
in response to determining that (i) the display device is of the particular type and (ii) the display device and the speech-enabled device both share the local area network, display on the display device an indication regarding pairing with the speech-enabled device.

2. The method of claim 1, wherein determining to pair a speech-enabled device with a display device of a particular type comprises:
receiving, from the speech-enabled device, an utterance including a term for the particular type of display device and a term corresponding to an instruction to pair.

3. The method of claim 1, wherein identifying a set of display devices that are associated with the speech-enabled device comprises:
identifying a user of the speech-enabled device; and
identifying display devices that are associated with an account of the user of the speech-enabled device.

4. The method of claim 1, wherein determine whether the display device and the speech-enabled device both share a local area network comprises:
provide a request that devices on the local area network identify themselves;
receive identifiers from the devices on the local area network in response to the request; and
determine whether any identifier received from the devices on the local area network matches an identifier of the speech-enabled device.

5. The method of claim 1, wherein display on the display device an indication regarding pairing with the speech-enabled device comprises:
displaying a prompt on the display device that requests that a user confirm whether to pair the display device with the speech-enabled device.

6. The method of claim 1, comprising:
determining that the speech-enabled device was not previously paired with a display device of the particular type.

7. The method of claim 1, wherein the display device comprises one or more of a tablet, laptop, or smartphone.

8. The method of claim 5, comprising:
receiving an indication from a particular display device of the display devices that confirms to pair the particular display device with the speech-enabled device; and
storing an indication to, in the future, pair the particular display device and the speech-enabled device in response to determining to pair the speech-enabled device with a display device of the particular type.

9. A computer-implemented method of pairing devices, the method comprising:
receiving a request to pair a first device with a second device, the request comprising an identifier associated with the first device;
determining a plurality of further devices based upon the request, wherein the plurality of further devices comprises the second device;
transmitting data associated with the identifier to each of the plurality of further devices;
receiving, from the second device, data indicating that the second device is connected to a local area network associated with the first device, wherein the data indicating that the second device is connected to a local area network associated with the first device is generated based upon the transmitted data associated with the identifier; and
storing data associating the first device with the second device based upon the received data indicating that the second device is connected to a local area network associated with the identifier.

10. The method of claim 9, wherein determining a plurality of further devices based upon the request comprises:
determining an account associated with the first device; and
determining devices associated with the account.

11. The method of claim 9, wherein each respective device of the plurality of devices is configured to, in response to receiving the identifier associated with the first device and for each network device connected to a respective local area network of the respective device:
determine whether the received identifier corresponds to an identifier associated with the network device.

12. The method of claim 9, wherein the first device is a speech-enabled device, and wherein the second device is a display device.

13. The method of claim 9, wherein each respective device of the plurality of devices is configured to receive an indication that an operation is being performed on one of the plurality of devices and provide the indication for output to a user.

14. The method of claim 9, further comprising receiving a device type, wherein the plurality of further devices are further determined based upon the device type.

15. The method of claim 9, wherein the second device comprises one or more of a tablet, laptop, or smartphone.

16. The method of claim 11, wherein determining whether the received identifier corresponds to an identifier associated with the network device is based upon a multicast processing.

17. The method of claim 11, wherein each respective device of the plurality of devices is configured to, in response to determining that the received identifier corresponds to an identifier associated with the network device:
display on a display of the respective device, an indication associated with pairing with the first device.

18. The method of claim 17, wherein each respective device of the plurality of devices is configured to receive user input in response to the indication associated with pairing with the first device.

19. The method of claim 18, wherein each respective device of the plurality of devices is configured to transmit data indicating that the respective device is connected to a local area network associated with the identifier.

20. The method of claim 12, further comprising causing data associated with the first device to be displayed by the second device based upon the stored data associating the first device with the second device.

21. The method of claim 12, wherein the request to pair a first device with a second device is generated based upon an utterance including a term corresponding to an instruction to pair the first device with a second device.

22. A computer-implemented method comprising:
determining to pair a speech-enabled device with a display device;

in response to determining to pair the speech-enabled device with the display device, identifying a set of display devices that are associated with the speech-enabled device;

for each of the display devices of the set of display devices that are identified, providing an instruction to the display device that causes the display device to:

determine whether the display device and the speech-enabled device both share a local area network; and in response to determining that the display device and the speech-enabled device both share the local area network, display on the display device an indication regarding pairing with the speech-enabled device.

23. The method of claim 22, wherein determining to pair a speech-enabled device with a display device comprises determining to pair the speech-enabled device with a display device of a particular type, wherein the instruction causes the display device to determine whether the display device is of the particular type and whether the display device and the speech-enabled device both share the local area network, wherein in response to determining that the display device is of the particular type and the display device and the speech-enabled device both share the local area network, display on the display device an indication regarding pairing with the speech-enabled device.

24. A non-transitory computer-readable medium storing software comprising instructions executable by one or more computers which, upon such execution, cause the one or more computers to perform operations comprising:

determining to pair a speech-enabled device with a display device of a particular type;

in response to determining to pair the speech-enabled device with the display device of the particular type, identifying a set of display devices that are associated with the speech-enabled device;

for each of the display devices of the set of display devices that are identified, providing an instruction to the display device that causes the display device to:

determine (i) whether the display device is of the particular type and (ii) whether the display device and the speech-enabled device both share a local area network; and in response to determining that (i) the display device is of the particular type and (ii) the display device and the speech-enabled device both share the local area network, display on the display device an indication regarding pairing with the speech-enabled device.

* * * * *